(12) United States Patent
Yang (10) Patent No.: US 7,616,454 B2
(45) Date of Patent: Nov. 10, 2009

(54) CONTROL CIRCUIT HAVING PROGRAMMABLE WAVEFORM FOR LIMITING OUTPUT POWER OF POWER CONVERTER

(75) Inventor: Ta-Yung Yang, Milpitas, CA (US)

(73) Assignee: System General Corporation, Taipei Hsien (TW)

( * ) Notice: Subject to any disclaimer, the term of this patent is extended or adjusted under 35 U.S.C. 154(b) by 116 days.

(21) Appl. No.: 11/304,610

(22) Filed: Dec. 16, 2005

(65) Prior Publication Data

US 2007/0139971 A1 Jun. 21, 2007

(51) Int. Cl.
*H02J 1/00* (2006.01)
*H02M 3/00* (2006.01)
*H02M 3/22* (2006.01)

(52) U.S. Cl. .................. 363/15; 363/21.04; 323/242
(58) Field of Classification Search .................. 363/15, 363/20, 21.01, 21.04; 323/242
See application file for complete search history.

(56) References Cited

U.S. PATENT DOCUMENTS

| | | | | |
|---|---|---|---|---|
| 4,466,127 A * | 8/1984 | Ohgishi et al. | ........... | 455/182.1 |
| 6,388,900 B1 * | 5/2002 | Hsu | ........... | 363/21.01 |
| 6,531,854 B2 * | 3/2003 | Hwang | ........... | 323/285 |
| 6,707,283 B1 * | 3/2004 | Ball | ........... | 323/284 |
| 6,982,882 B2 * | 1/2006 | Chu et al. | ........... | 363/21.01 |
| 7,057,907 B2 * | 6/2006 | Oh | ........... | 363/21.05 |
| 2002/0186571 A1 * | 12/2002 | Tsuge | ........... | 363/21.01 |
| 2004/0125620 A1 * | 7/2004 | Yamashita | ........... | 363/21.01 |

\* cited by examiner

*Primary Examiner*—Edward Tso
*Assistant Examiner*—Arun Williams
(74) *Attorney, Agent, or Firm*—Rosenberg, Klein & Lee (57) ABSTRACT

A control circuit having a programmable waveform for the output power limit comprises an oscillation circuit to generate an oscillation signal. The oscillation signal is used for producing a switching signal to control a switching device in response to a feedback signal of the power converter. A waveform generator generates a waveform signal in accordance with the oscillation signal. The waveform signal controls the control signal and limits the output power of the power converter. A resistor is coupled to the waveform generator to program the waveform of the waveform signal. By properly selecting the resistance of the resistor, which can be used to achieve an identical output power limit of the power converter for the low line and high line voltage input.

3 Claims, 6 Drawing Sheets

CONTROL CIRCUIT HAVING PROGRAMMABLE WAVEFORM FOR LIMITING OUTPUT POWER OF POWER CONVERTER

BACKGROUND OF THE INVENTION

1. Field of the Invention

The present invention relates to a power converter, and more particularly, to a control circuit used for limiting the output power of a switching power converter.

2. Description of Related Art

Figure 1:
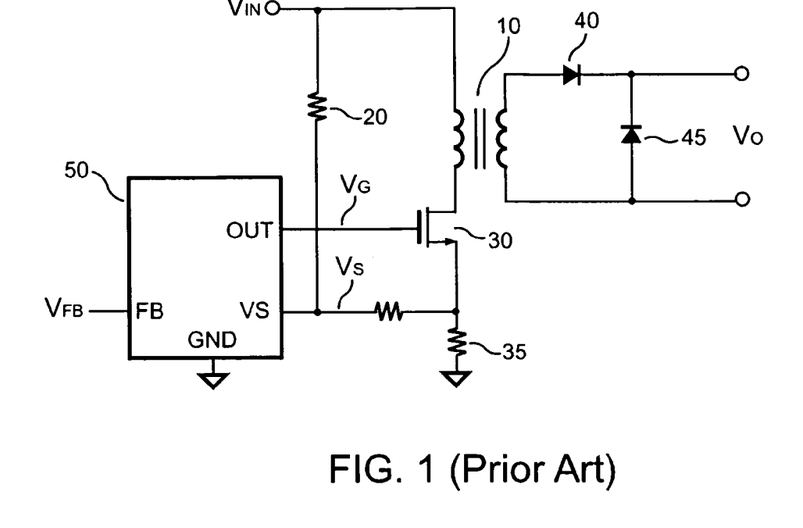
FIG. 1 shows a conventional power converter.
Figure 2:
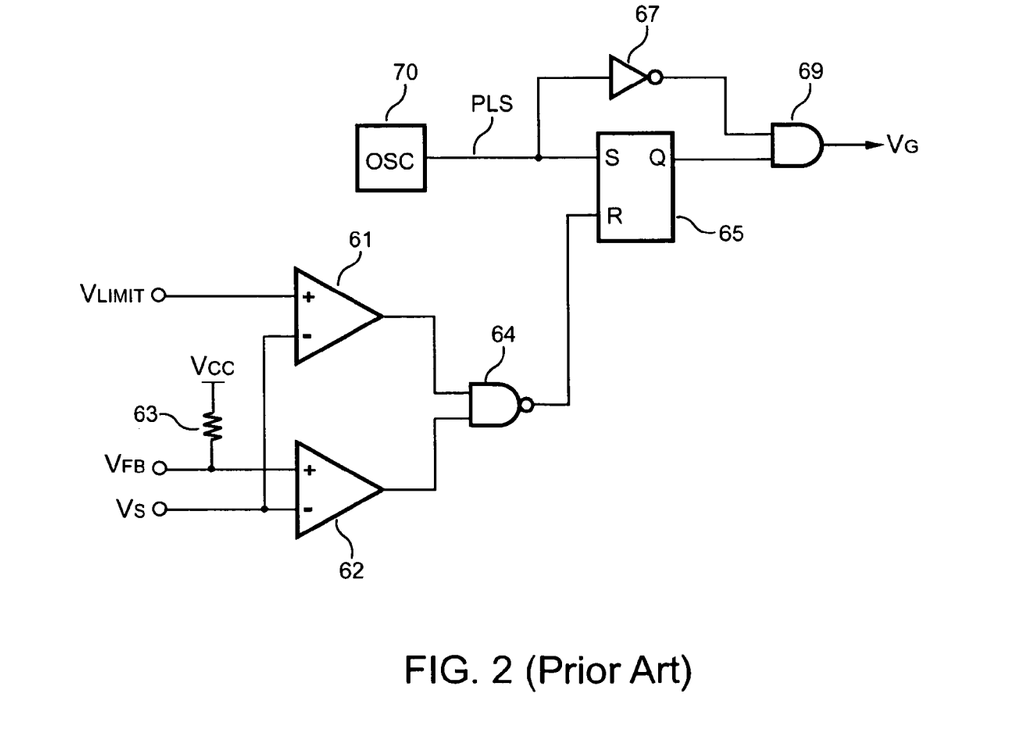
FIG. 2 shows the circuit schematic of the control circuit of the conventional power converter.

The switching power control is a conventional technology used in a power converter to control and regulate the output power. Various protection functions, such as over-voltage and over-current protections, are built-in in the power converter to protect the power converter and circuits connected thereto from permanent damage. The function of output power limit is generally used for overload and short-circuit protection. Referring to FIG. 1, a traditional power converter circuit includes a feed-forward compensation. A control circuit 50 generates a control signal $V_G$ to regulate the output of the power converter in response to a feedback signal $V_{FB}$. The control signal $V_G$ drives a switch 30 for switching a transformer 10. A resistor 35 that is connected in series with the switch 30 determines the maximum output power of the power converter. The resistor 35 turns the switching current of the transformer 10 to a current signal $V_S$. The current signal is coupled to the control circuit 50. FIG. 2 shows the circuit schematic of the control circuit 50. If the current signal $V_S$ is greater than a maximum threshold $V_{limit}$, the control circuit 50 disables the control signal $V_G$, and it also restricts the maximum power output. The energy stored in an inductor is given by, $$\varepsilon = \frac{1}{2} \times L \times I^2 = P \times T$$

where P is the maximum output power and can be expressed by, $$I_P = \frac{V_{IN}}{L_P} \times t_{ON} \quad (1)$$

$$P = \frac{L_P}{2 \times T} \times I_P^2 = \frac{V_{IN}^2 \times t_{ON}^2}{2 \times L_P \times T} \quad (2)$$

Figure 3:
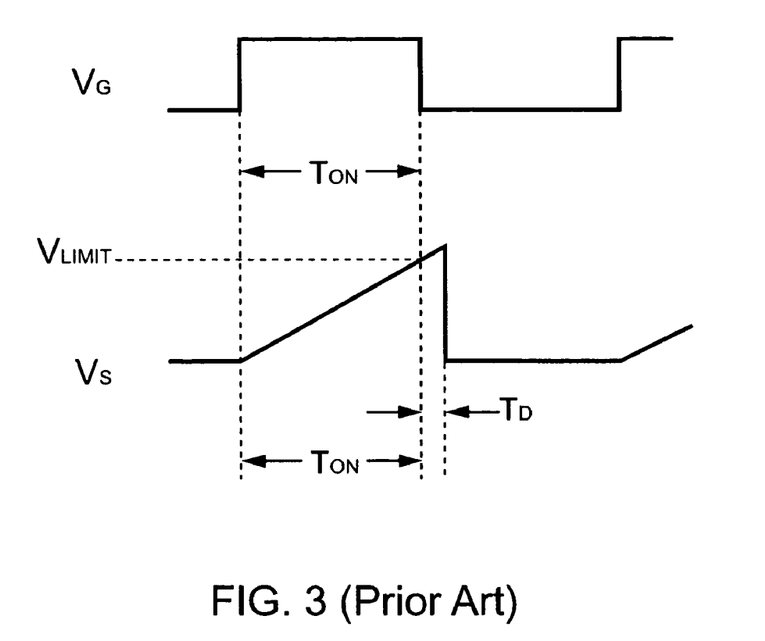
FIG. 3 shows the waveforms of the conventional power converter.

In Equations (1) and (2), Ip and Lp are the primary current and the primary inductance respectively of the transformer 10, $t_{ON}$ is the switch-on period of the control signal $V_G$ while the switch 30 is switched on, and T is the switching period of the control signal. From Equation (2), we find that the output power varies as the input voltage $V_{IN}$ varies. If the safety regulations are taken into consideration, the input voltage ranges between $90V_{AC}$ and $264V_{AC}$, wherein the out power limit of the power converter in high line voltage is many times higher than the output power limit in low line voltage. Although the output voltage (power) keeps a constant by automatically adjusting $t_{ON}$ through a feedback loop, the maximum $t_{ON}$ is restricted when the current signal $V_S$ is greater than or equal to $V_{limit}$ (Ip×Rs≧$V_{limit}$, where Rs is the resistance of the resistor 35). Furthermore, the maximum output power is also affected by the delay time $t_D$ of the control circuit. There is a delay time $t_D$ from the moment the voltage in current signal $V_S$ is higher than the upper limit voltage (Ip×Rs≧Vlimit) to the moment the control signal $V_G$ is actually turned off. In the period of the delay time $t_D$, the switch 30 is still turned on, and it keeps on delivering power as shown in FIG. 3. Therefore, the actual turned-on time of the control signal is equal to $t_{ON}+t_D$, and the actual output power becomes as follows:

$$P = \frac{V_{IN}^2 \times (t_{ON} + t_D)^2}{2 \times L_P \times T} \quad (3)$$

Although the tD time is short, generally within the range of 200 nsec~350 nsec, the higher the operating frequency is, the more impact is caused by tD. Because the switching period T is short tD, it becomes more important relatively. The input voltage VIN should be compensated properly, such that the input voltage does not affect the maximum output power. Referring to FIG. 1, a resistor 20 is added between the input voltage VIN and the current signal $V_S$ for the feed-forward compensation. The function of the resistor 20 can compensate the difference caused by the input voltage VIN and the delay time tD. By properly selecting the resistance of the resistor 20, an identical output power limit for the low line and high line voltage input can be resulted. The following analysis illustrates how the resistor 20 is determined for reaching an identical output power limit.

With the incorporation of the resistor 20, the current signal $V_S$ can be expressed by, $$V_S = \left(\frac{V_{IN}}{L_P} \times R_S \times t_{ON}\right) + (V_{IN} \times FFc) \quad (4)$$

where FFc=R25/(R25+R20), R20 and R25 are the resistance of resistor 20 and 25 respectively.

The control signal $V_G$ is turned off when $V_S \geq V_{LIMIT}$, and $t_D$ and $t=t_{ON}+t_D$ are substituted into the equation (4), $V_{LIMIT}$ can be expressed by, $$V_{LIMIT} = \left[\frac{V_{IN}}{L_P} \times R_S \times (t - t_D)\right] + (V_{IN} \times FFc) \quad (5)$$

The expression of "$V_{IN} \times FFc=(V_{IN}/L_P) \times R_S \times t_D$" is set to achieve the identical output power limit. We finally get $$FFc = \frac{R_S}{L_P} \times t_D \quad (6)$$

However, the resistor 20 causes the significant power consumption, especially in high line voltage input. The power consumption can be expressed by, $$P_R = \frac{V_{IN}^2}{R_{20}} \quad (7)$$

Besides, the high voltage existing in the resistor 20 causes the drawback for the component selection and a PCB layout.

SUMMARY OF THE INVENTION

The invention provides a control circuit having a programmable waveform for the output power limit of a power converter. The control circuit comprises a switch coupled to a transformer for switching the transformer. An oscillation circuit is used for generating an oscillation signal. A first circuit generates a control signal to control the switch in response to the oscillation signal and a feedback signal for regulating the output of the power converter. A second circuit generates a waveform signal in accordance with the oscillation signal to control the control signal and limit the output power of the power converter. A resistor is coupled to the second circuit to program the waveform of the waveform signal. By properly selecting the resistance of the resistor can achieve an identical output power limit of the power converter for the low line and high line voltage input. Advantageously, the control circuit of the present invention can provide a programmable compensation for the output power limit of the power converter. Therefore, no resistor is needed to apply to sensing the line voltage for the feed-forward compensation, which reduces the power consumption, simplify the PCB layout, and shrinks the size of power converter.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention together with the description, which serve to explain the principles of the invention.

DESCRIPTION OF THE PREFERRED EMBODIMENTS

Figure 4:
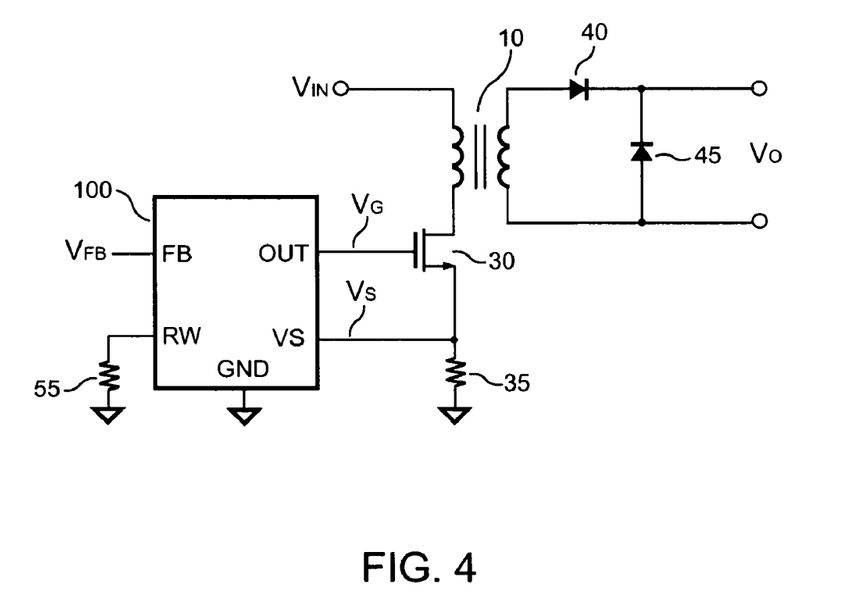
FIG. 4 shows a power converter having a control circuit in accordance with the present invention.
Figure 5:
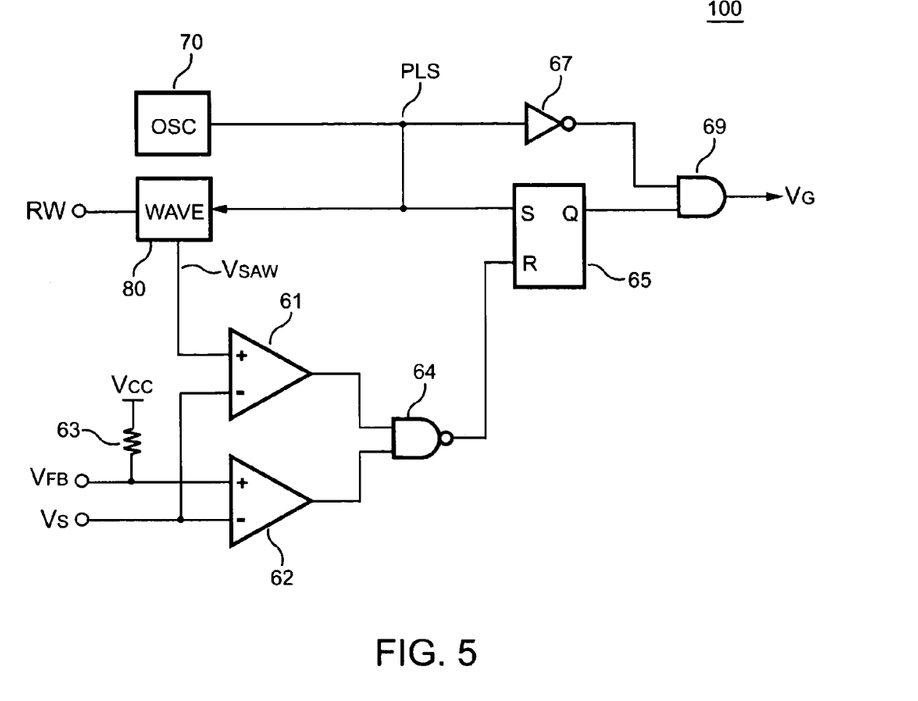
FIG. 5 illustrates the circuit schematic of the control circuit having a programmable waveform for power limit of the power converter in accordance with the present invention.

FIG. 4 shows a power converter having control circuit 100 in accordance with the present invention. The control circuit generates the control signal $V_G$ to control the switch 30. The switch 30 is coupled to the transformer 10 for switching the transformer 10 and transferring the energy to the output of the power converter. The resistor 35 is connected to the switch 30 for detecting and converting the switching current of the switch 30 to the current signal $V_S$. The current signal $V_S$ is further coupled to the control circuit 100 for the output power control. A resistor 55 is connected to the control circuit 100 for programming a waveform signal $V_{SAW}$ for the output power limit of the power converter. FIG. 5 illustrates the circuit schematic of the control circuit 100 comprises an oscillation circuit 70, a first circuit, a second circuit 80 and a terminal RW for connecting the resistor 55. The oscillation circuit 70 generates an oscillation signal PLS. The first circuit includes a flip-flop 65, a first comparator 62, a second comparator 61, an NAND gate 64, an inverter 67 and an AND gate 69 for generating the control signal $V_G$ to control the switch 30 in response to the oscillation signal PLS and the feedback signal $V_{FB}$ for regulating the output of the power converter. The second circuit 80 is used for generating a waveform signal $V_{SAW}$ in accordance with the oscillation signal PLS to control the control signal $V_G$ and limit the output power of the power converter. The resistor 55 is coupled to the second circuit 80 through the terminal RW to program the waveform of the waveform signal $V_{SAW}$.

The input of the AND gate 69 is connected to the flip-flop 65 to generate the control signal $V_G$ in response to the oscillation signal PLS. Another input of the AND gate 69 is connected to the oscillation signal PLS through the inverter 67. The oscillation signal PLS is connected to the flip-flop 65 to turn on the control signal $V_G$. The off-state of the control signal $V_G$ is controlled through the NAND 64. The inputs of the NAND gate 64 are connected to a first reset signal and a second reset signal. The output of the first comparator 62 generates the first reset signal. The inputs of the first comparator 62 are coupled to receive the feedback signal $V_{FB}$ and the current signal $V_S$. The current signal $V_S$ is generated through the resistor 35 in accordance with the switching current of the switch 30. The feedback signal $V_{FB}$ is coupled from the output of the power converter for the feedback loop control. The output of the second comparator 61 generates a second reset signal. The input of the second comparator 61 is coupled to receive the waveform signal $V_{SAW}$ and the current signal $V_S$.

Figure 6:
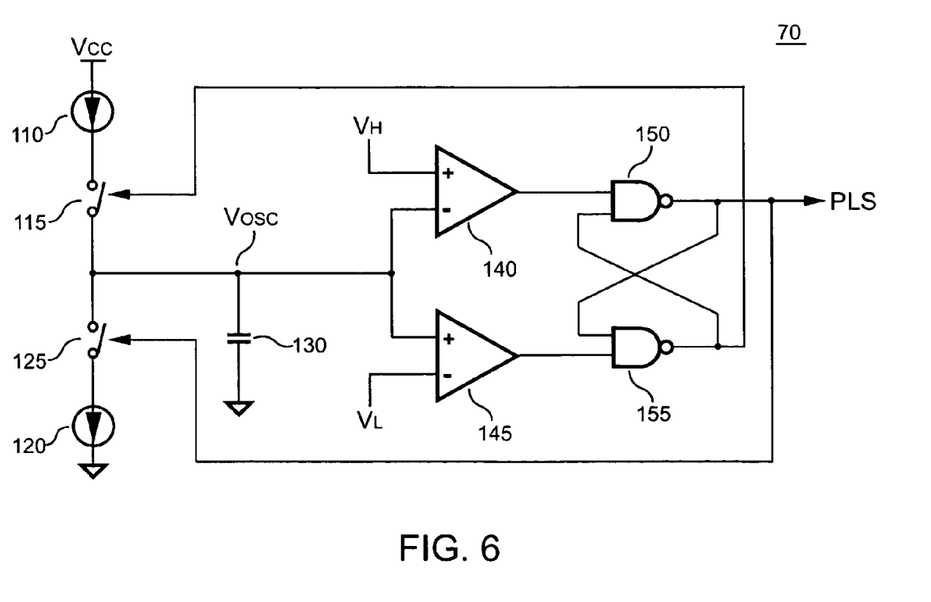
FIG. 6 shows an oscillation circuit.

FIG. 6 shows the oscillation circuit 70. The oscillation circuit includes a charge current 110 connected in series with a switch 115 and a discharge current 120 connected in series with a switch 125 for charging or discharging a capacitor 130 respectively. A saw-tooth signal $V_{OSC}$ is therefore produced on the capacitor 130. Comparators 140, 145 and NAND gates 150, 155 generate oscillation signal PLS to control switches 115 and 125. The oscillation signal is further connected to the second circuit 80 to enable the waveform signal $V_{SAW}$.

Figure 7:
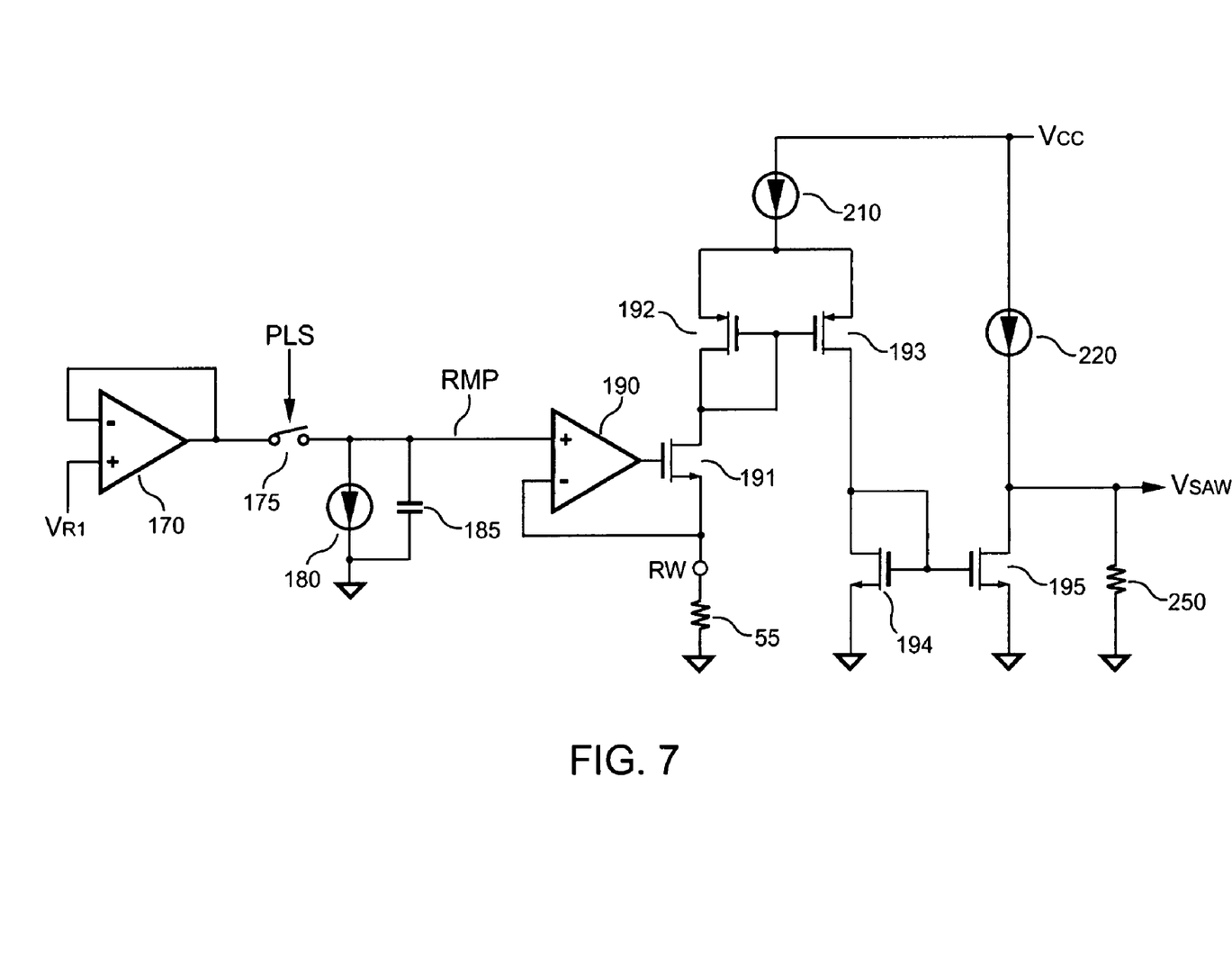
FIG. 7 illustrates a second circuit generating the waveform signal for power limit of the power converter in accordance with the present invention.
Figure 8:
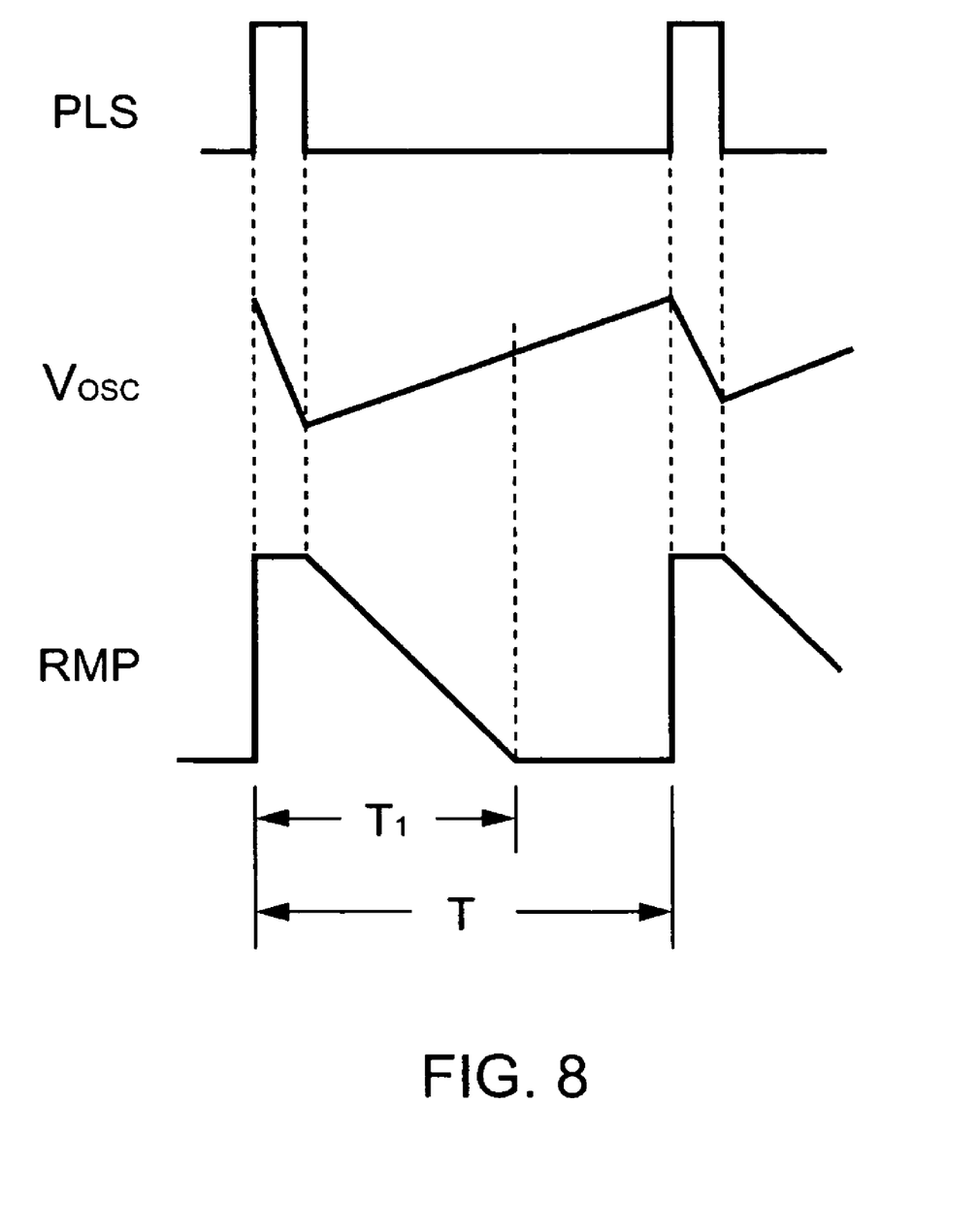
FIG. 8 shows the waveforms of the control circuit in accordance with the present invention.

FIG. 7 illustrates the second circuit 80. The second circuit 80 comprises a third circuit, a fourth circuit, a current mirror circuit, a constant current signal 220 and a resistor 250 to generate the waveform signal $V_{SAW}$. The third circuit includes a reference voltage $V_{R1}$, a buffer 170, a switch 175, a constant current signal 180 and a capacitor 185 to generate a ramp signal RAMP in response the oscillation signal PLS. Waveforms of the ramp signal RAMP, the saw-tooth signal VSOC and the oscillation signal PLS are shown in FIG. 8. The capacitor 185 is charged to the reference voltage $V_{R1}$ when the oscillation signal PLS is on. Once the oscillation is off, the capacitor 185 will be discharged through the constant current signal 180. The current of the constant current signal 180 and the capacitance of the capacitor 185 determine the slew rate of the ramp signal RAMP. The ramp signal RAMP is thus generated on the capacitor 185. The fourth circuit includes an operational amplifier 190, a transistor 191 connected to the ramp signal RAMP and the terminal RW. The operational amplifier 190, the transistor 191 and the resistor 55 develop a voltage-to-current converter to generate a fourth current signal in accordance with the ramp signal and the resistor 55. The current mirror circuit has transistors 192, 193, 194, 195 and a constant current signal 210. The constant current signal 210 is applied to limit the current and protect the circuit when a short-circuit condition is happened across the resistor 55. Transistors 192, 193 form a first current mirror receiving the fourth current and producing a current connected to transistors 194, 195. Transistors 194, 195 further form a second current mirror to produce a fifth current signal. The fifth current signal and the constant current signal 210 are connected to the resistor 250 to generate the waveform signal $V_{SAW}$. The waveform signal is this can be expressed by, $$V_{SAW} = \left[I_{210} - \left(K \times \frac{V_{RAMP}}{R_{55}}\right)\right] \times R_{250} \quad (8)$$

where the $I_{250}$ is the current of the constant current signal 210; K is a constant of the current mirror; $V_{RAMP}$ is the voltage of the ramp signal RAMP; $R_{55}$ is the resistance of the resistor 55, and $R_{250}$ is the resistance of the resistor 250.

Figure 9:
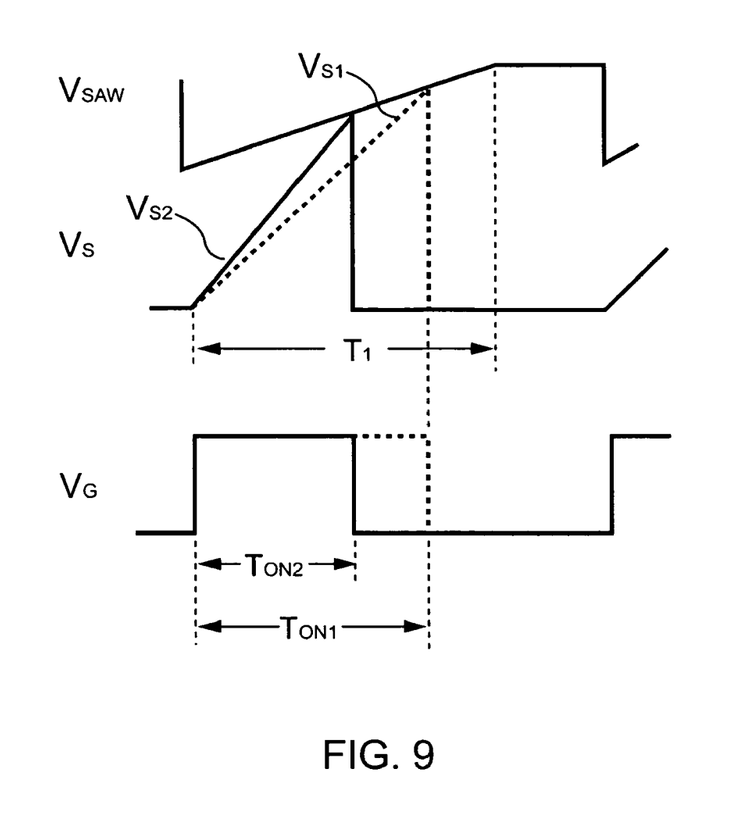
FIG. 9 shows the waveforms of the waveform signal, the current signal and the control signal.
Figure 10:
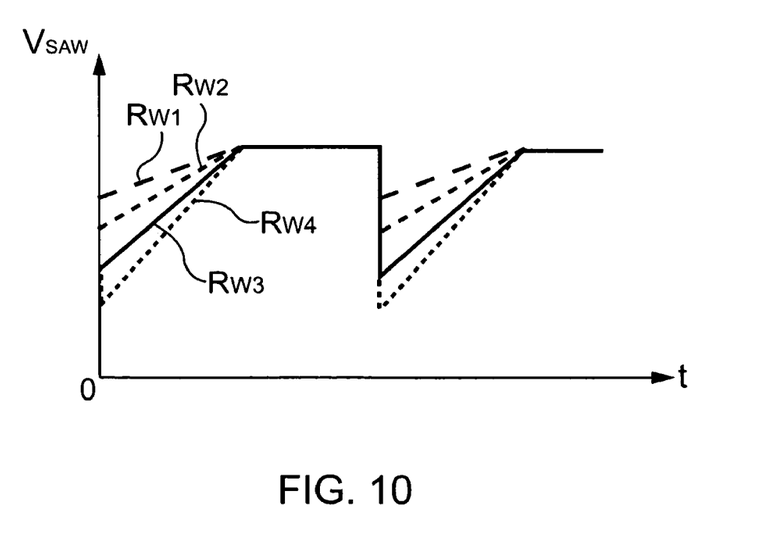
FIG. 10 shows the waveforms of the programmable waveform signal in accordance with the present invention.

FIG. 9 shows the waveforms of the waveform signal $V_{SAW}$, the current signal $V_S$ and the control signal $V_G$. FIG. 10 shows waveforms of the waveform signals $V_{SAW}$ that is programmed by different resistance of the resistor 55. Referring to equation (8), in which the $V_{RAMP}$ is given by, $$V_{RAMP} = V_{R1} \times \left(\frac{T_1 - t_{ON}}{T_1}\right) \quad (9)$$

Therefore the equation (8) can be rewritten as, $$V_{SAW} = V_R - \left[\left(V_{R1} \times K \times \frac{R_{250}}{R_{55}} \times \left(\frac{T_1 - t_{ON}}{T_1}\right)\right)\right] \quad (10)$$

where the constant current 210 and the resistor 250 determine the voltage $V_R$; the compensation period $T_1$ is decided by the constant current signal 180 and the capacitor 185.

The control signal $V_G$ is turned off when the current signal $V_S$ is higher than the waveform signal $V_{SAW}$. The waveform signal $V_{SAW}$ reaches the lowest value while the control signal $V_G$ starts. Then, the amplitude of the waveform signal $V_{SAW}$ gradually increases until it reaches its maximum voltage. The voltage $V_R$ decides the maximum value of the waveform signal $V_{SAW}$. In order to limit the output power and protect the power converter in the low line voltage conditions, such as a brownout condition. The compensation period $T_1$ is designed and limited. The waveform signal $V_{SAW}$ is restricted for a broader control signal $V_G$, which limits the output power of the power converter when a low line voltage inputs. The FIG. 9 displays the waveform of the current signal $V_{S2}$ that is produced by a high line voltage, in which a shorter control signal $V_G$ is generated. The current signal $V_{S1}$ is produced by a low line voltage, in which the control signal $V_G$ with a broader pulse width is generated. Therefore, a higher line voltage creates a sharp slope for the current signal $V_S$ that is restricted by a lower waveform signal $V_{SAW}$ and produces a shorter control signal $V_G$. The control signal $V_G$ is turned off once the voltage of the current signal $V_S$ is higher than the waveform signal $V_{SAW}$, it can be expressed by, $$V_{SAW} = \left[\frac{V_{IN}}{L_P} \times R_S \times (t_{ON} + t_D)\right] \quad (11)$$

Referring to equation (10) and (11), the equality can be expressed by, $$V_R - \left[\left(V_{R1} \times K \times \frac{R_{250}}{R_{55}} \times \left(\frac{T_1 - t_{ON}}{T_1}\right)\right)\right] = \left[\frac{V_{IN}}{L_P} \times R_S \times (t_{ON} + t_D)\right] \quad (12)$$

$$V_R - \left[\left(V_{R1} \times K \times \frac{R_{250}}{R_{55}} \times \left(\frac{T_1 - t_{ON1}}{T_1}\right)\right)\right] = \left[\frac{V_{IN1}}{L_P} \times R_S \times (t_{ON1} + t_D)\right] \quad (13)$$

$$V_R - \left[\left(V_{R1} \times K \times \frac{R_{250}}{R_{55}} \times \left(\frac{T_1 - t_{ON2}}{T_1}\right)\right)\right] = \left[\frac{V_{IN2}}{L_P} \times R_S \times (t_{ON2} + t_D)\right] \quad (14)$$

In the equation (13) and (14), $V_{IN2}$ and $V_{IN1}$ represent a higher and a lower line voltage respectively. The $V_{IN2}$ produces a shorter on-time $t_{ON2}$, and the $V_{IN1}$ produces a broader on-time $t_{ON1}$. By controlling the feedback control of the power converter, it is given by, $$\frac{V_{IN2}}{L_P} \times R_S \times t_{ON2} = \frac{V_{IN1}}{L_P} \times R_S \times t_{ON1} \quad (15)$$

Equation (16) shows the result subtracting equation (13) from equation (14):

$$\left[V_{R1} \times \frac{K}{T_1} \times \frac{R_{250}}{R_{55}} \times |(t_{ON2} - t_{ON1})|\right] = \left[\frac{(V_{IN2} - V_{IN1})}{L_P} \times R_s \times t_D\right] \quad (16)$$

The equation (16) can be rewritten as, $$R_{55} = \left[V_{R1} \times \frac{K}{T_1} \times \frac{R_{250}}{(V_{IN2} - V_{IN1})} \times |(t_{ON2} - t_{ON1})|\right] \times \frac{L_P}{(R_s \times t_D)} \quad (17)$$

For the various design of the power supplies, such as a high or low power output, a fast or low speed, the inductance of the transformer $L_P$, resistance $R_S$, and the delay time $t_D$ of the control circuit are different. By properly selecting the value of the resistor 55, thereby the resistor 55 can be used to achieve an identical output power limit for the low line and high line voltage input.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit having an adjustable waveform for limiting an output power of a power converter, comprising:
   a switch, coupled to a transformer for switching the transformer;
   an oscillation circuit, generating an oscillation signal;

a first circuit, generating a temporally variable control signal to control the switch in response to the oscillation signal and a feedback signal for regulating the output of the power converter; said control signal having a temporal width responsive to a temporal width of a current signal;

a second circuit, generating an adjustable waveform signal in accordance with the oscillation signal to control the control signal and limit the output power of the power converter; wherein the waveform signal is synchronized with the control signal, and the control signal is switched off when the voltage of the current signal exceeds the voltage of the waveform signal;

a third circuit, generating a ramp signal in response to the oscillation signal; and a variable resistor, coupled to the second circuit to program the adjustable waveform of the waveform signal; said resistor externally interposed between ground and the control circuit; wherein the value of the resistor directly adjusts the voltage of the adjustable waveform signal;

wherein the current signal is responsive to low and high input line voltages, such that the power converter produces equal output power for both the low and high input line voltages.

2. The control circuit as claimed in claim 1, the first circuit comprising:

a flip-flop, generating the control signal in response to the oscillation signal;

a first comparator, coupled to receive the feedback signal and the current signal, and generate a first reset signal, in which the current signal is generated in accordance with a switching current of the switch; and a second comparator, coupled to receive the waveform signal and the current signal, and generate a second reset signal;

wherein the oscillation signal is applied to turn on the control signal, in which the first reset signal and the second reset signal are utilized to turn off the control signal.

3. The control circuit as claimed in claim 1, the second circuit comprising:

a fourth circuit, generating a fourth current signal in accordance with the ramp signal and the resistor;

a current mirror circuit, producing a fifth current signal in accordance with the fourth current signal; and a first resistor, generating the waveform signal in accordance with a constant current signal and the fifth current signal.

* * * * *